July 2, 1963

C. MYHRE 3,096,111

BALL LOCK COUPLING

Filed Sept. 28, 1960

INVENTOR.
CURTH MYHRE

BY

*A. Fredrich Hamann*

ATTORNEY

INVENTOR.
CURTH MYHRE

July 2, 1963

C. MYHRE 3,096,111

BALL LOCK COUPLING

Filed Sept. 28, 1960

INVENTOR.
CURTH MYHRE

BY

ATTORNEY

July 2, 1963  C. MYHRE  3,096,111
BALL LOCK COUPLING
Filed Sept. 28, 1960  4 Sheets-Sheet 4

INVENTOR.
CURTH MYHRE
BY
*L. Fredrick Hamann*
ATTORNEY 3,096,111
BALL LOCK COUPLING
Curth Myhre, Chatsworth, Calif., assignor, by mesne assignments, to the United States of America as represented by the United States Atomic Energy Commission
Filed Sept. 28, 1960, Ser. No. 58,959
8 Claims. (Cl. 287—58)

The present invention relates to a coupling and more particularly to a releasable coupling between a control rod and a control rod drive mechanism.

In the operation and maintenance of a control rod in a nuclear reactor it is imperative that the drive mechanism be separable from the control element for replacement or maintenance without requiring the removal of the control element. Further, where the control element is not to be used as a safety element, the disengagement of the control element from the drive must be allowed only when the control element is in its fully lowered position.

It is therefore an object of the present invention to provide a coupling particularly adaptable for use with a control rod.

It is a further object of the present invention to provide a coupling which cannot be disengaged unless the control rod is in its lowest position.

It is another object of the present invention to provide a coupling which does not require any tools or additional drive or rotary equipment other than the control rod drive mechanism.

It is another object of the present invention to provide a coupling which cannot be disconnected merely by removing the weight being supported by the coupling.

These and other objects of the present invention will be more apparent from the following detailed description and drawings, hereby made a part hereof, in which.

Figure 1:
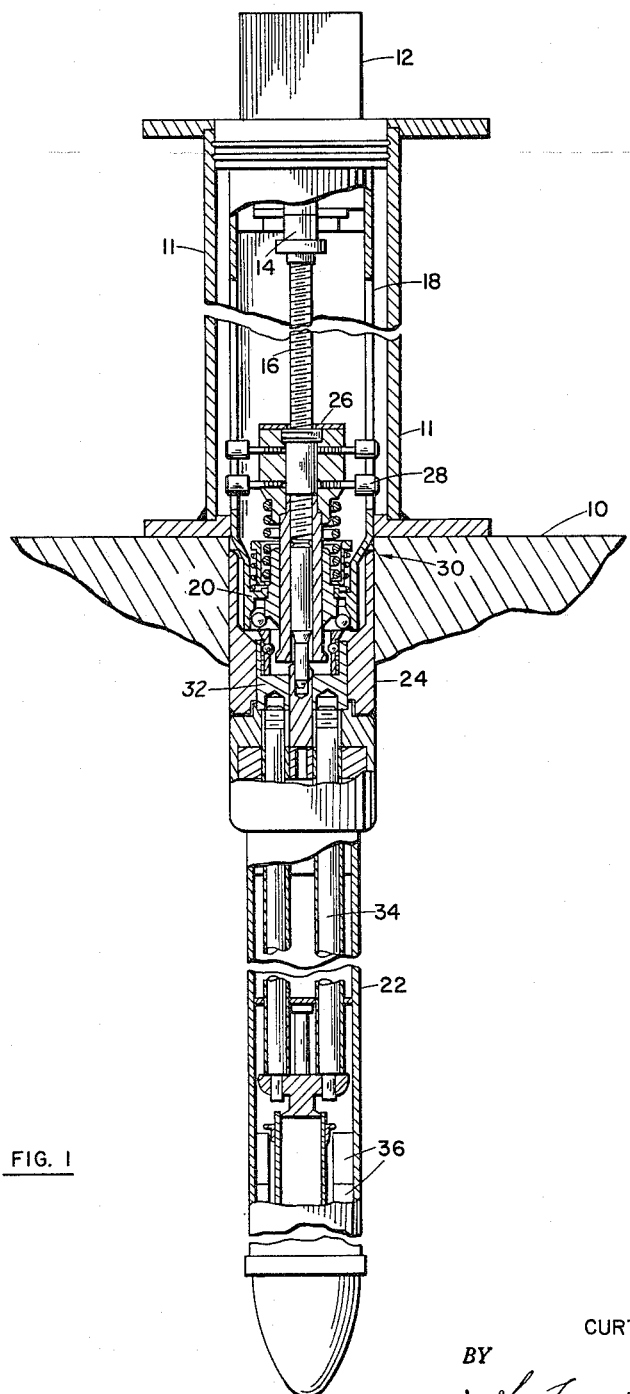
FIGURE 1 is a partially sectioned view of a control rod assembly utilizing the coupling of the present invention.

The coupling of the present invention is shown as used in a control rod for a nuclear reactor in FIGURE 1. It is supported on the reactor face 10 by a support column 11 on which is mounted the drive mechanism 12. The drive mechanism 12 has a main shaft 14 which is releasably connected to ball screw 16 which extends downwardly and is centrally located within guide tube 18. The guide tube 18 and drive mechanism 12, as well as the main shaft 14 and ball screw 16, are removably supported on support column 11. The lower, reduced diameter portion 20 of the guide tube 18 fits within the upper portion 24 of a thimble 22 which is integrally attached to the reactor face 10. Ball screw 16 passes through a ball nut 26 which moves upwardly or downwardly along the ball screw 16 upon rotation of the main shaft 14 by the drive mechanism 12 and is prevented from rotation about the ball screw 16 by a plurality of roller cam followers 28 which travel in slots provided in the guide tube 18. The ball nut 26 is connected to the coupling of the present invention indicated generally as 30, which coupling releasably engages the latch cup or connector 32. The latch cup 32 is integrally attached to four downwardly extending support rods 34 on which poison rings 36 are attached. In this manner rotation by the drive mechanism 12 of the main shaft 14 and ball screw 16 moves the ball nut upwardly or downwardly and through the coupling 30 when engaged with connector 32 moves the rods 34 and poison rings 36 to various positions within the core of a reactor.

Figure 2:
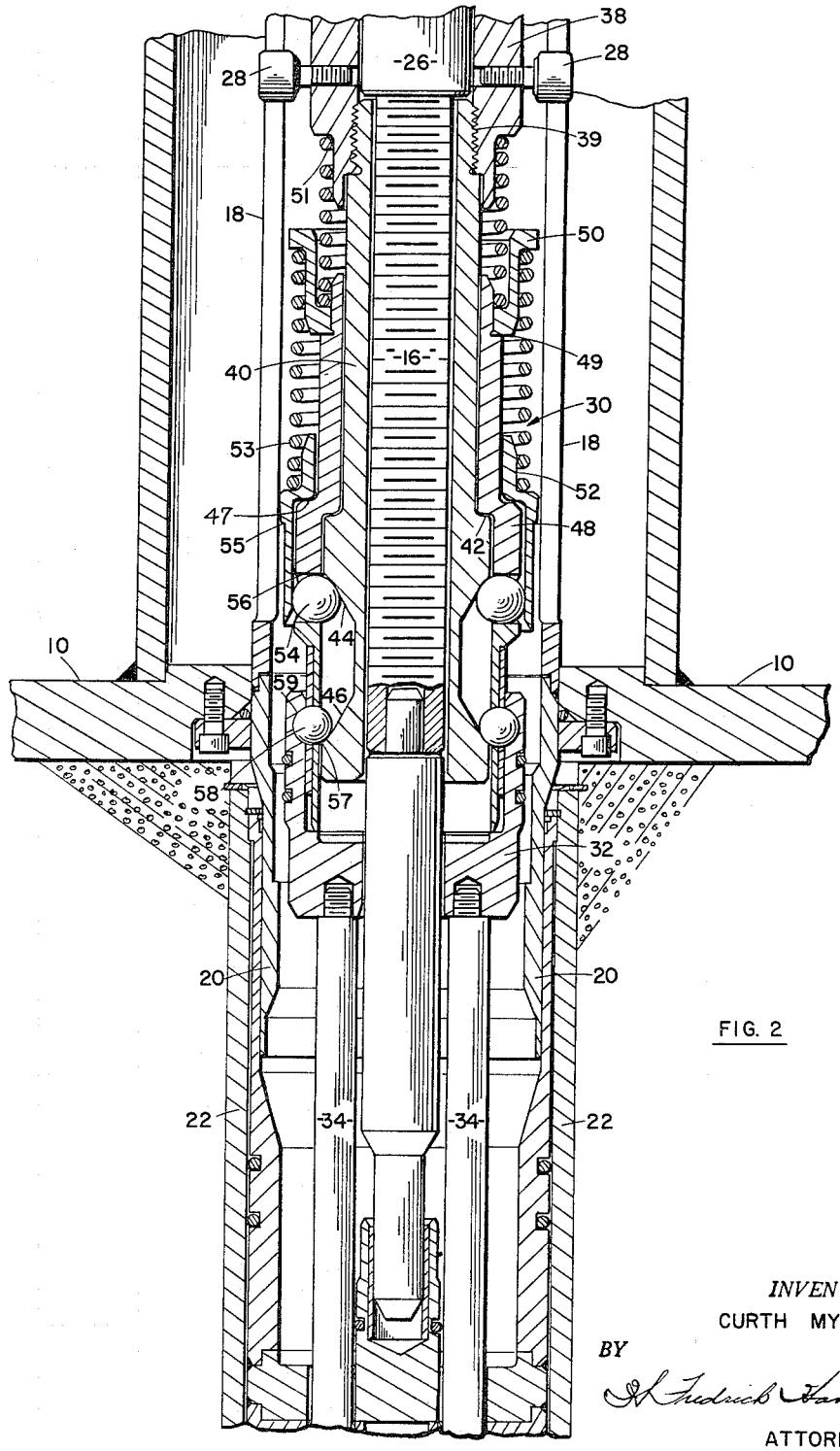
FIGURE 2 is a sectional view of the coupling in its positive connection position.

The coupling indicated generally at 30 in FIGURE 1 is shown in more detail in FIGURE 2 and is shown in FIGURE 2 in the engaged operative position for positively driving the support rods 34 and poison rings 36 upwardly or downwardly. The coupling consists of a ball nut connector 38 integrally attached to the ball nut 26 on which the roller cam followers 28 are maintained. The cylindrical ball nut connector 38 has an internally threaded portion 39 to which a plunger 40 is connected. The plunger 40 is cylindrical in shape and has a hollow central portion through which the ball screw 16 passes and has on its outer surface a shoulder 42 and a reduced diameter portion consisting of an upper cam surface 44 and lower cam surface 46. A cylindrical sleeve 48 which has an internal shoulder abutting shoulder 42 in the position shown in FIGURE 2 is freely slidable along the outer surface of plunger 40 and is maintained in abutting relationship with shoulder 42 by a retainer ring 50 which is biased downwardly by spring 51 and engages the sleeve 48 on a shoulder 49. An upper ball lock retainer 52 is slidable along the outside surface of sleeve 48 and in the position shown in FIGURE 2 is in abutting relationship with a shoulder 47 of sleeve 48. The ball lock retainer 52 is biased downwardly to engage shoulder 47 by a spring 53 which engages the retainer ring 50. The upper ball lock retainer 52 also has an outwardly extending shoulder 55 for engaging the lower portion of guide tube 18, as will be described in detail hereinafter. The sleeve 48 has a plurality of apertures 56 on its circumference, into which upper locking balls 54 are laterally movable. The sleeve 48 also has a second series of apertures 57 axially spaced from apertures 56 in which a plurality of rod interlocking balls 58 are laterally movable to engage connector or latch 32. A retainer sleeve is also provided to limit the outward movement of the locking balls 58. In the position shown in FIGURE 2 upper lock retainer 52 maintains the upper locking ball 54 in engagement with plunger 40 so that a positive connection is maintained between the plunger 40 and the sleeve 48 through upper locking balls 54. In this manner movement downwardly of the ball nut 26 transmits the force positively through plunger 40 and sleeve 48 so that sleeve 48 will maintain its abutting relationship at shoulder 42. The rod interlock ball 58 is maintained in its outward position as shown in FIGURE 2 by the cam surface 46, which is maintained in the position shown by the abutting relationship between the cam surface 44 and the upper locking ball 54. In this manner rod interlocking ball 58 cannot move laterally when the plunger and sleeve are maintained in their relationship as shown in FIGURE 2. Further, it is apparent that upon movement of the ball nut 26 upwardly the upward movement is not only transmitted through the shoulder 42 to move the sleeve 48 upwardly, but is also transmitted through the cam surface 46 and ball 58 to the detent 59 in the latch cup or connector 32 so that a positive connection is maintained between the ball nut 26 and the connector 32 to move the rods 34 and poison rings 36. In this position any movement of ball nut 26 is transmitted through the connector to the rods 34 and a positive engagement is always maintained.

It is also apparent from FIGURE 2 that even though the weight of the rods 34 and poison rings 36 is not maintained on the connector 32, the cam surface 46 will be maintained in its position and the latch cup 32 cannot be disconnected from the ball nut in any manner. Thus, no possibility exists of the control rod supported by connector 32 being dropped into the reactor, thereby damaging the thimble or the control rod, or that if the control rod should stick at a point along its travel, that the coupling would be disconnected by the inadvertent removal of the weight of the control rod.

Figure 3:
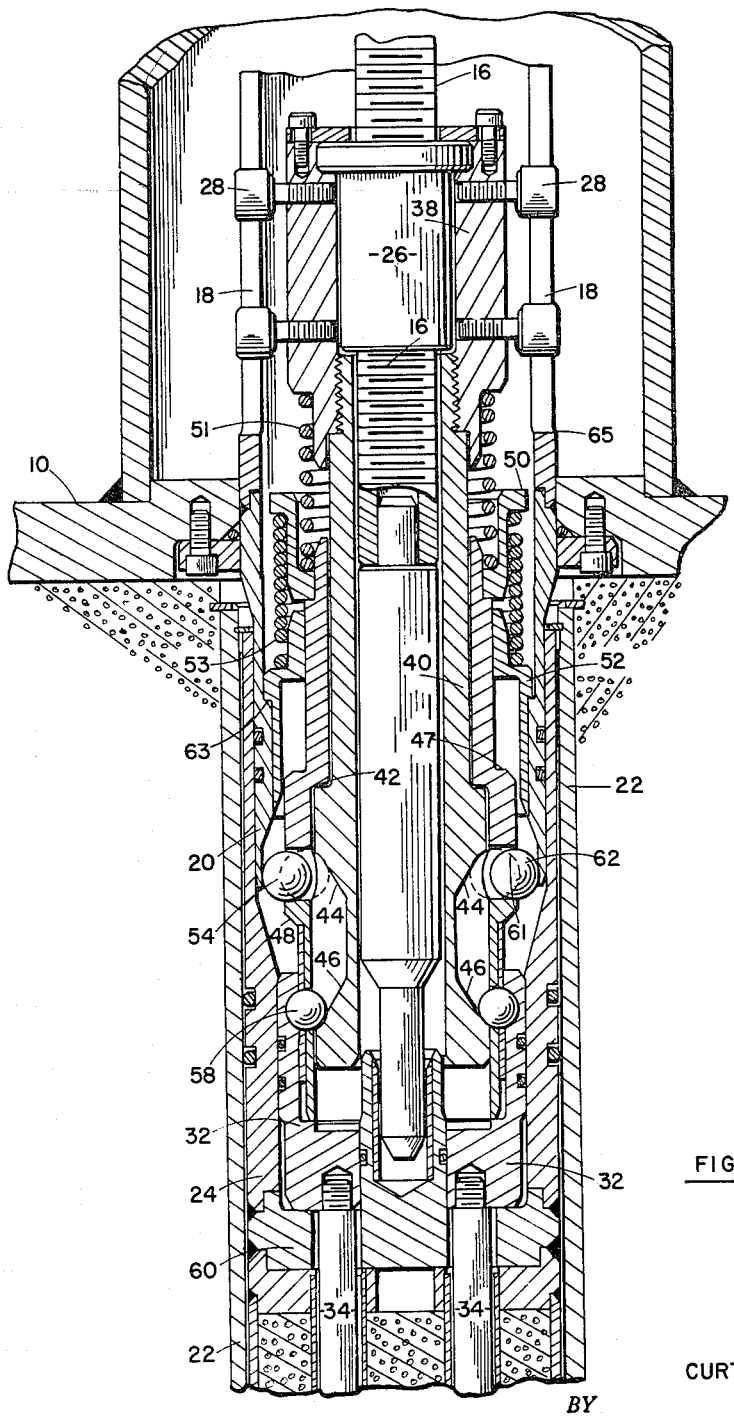
FIGURE 3 is a sectional view of the coupling in a position where the control rod is in its lowered position.
Figure 4:
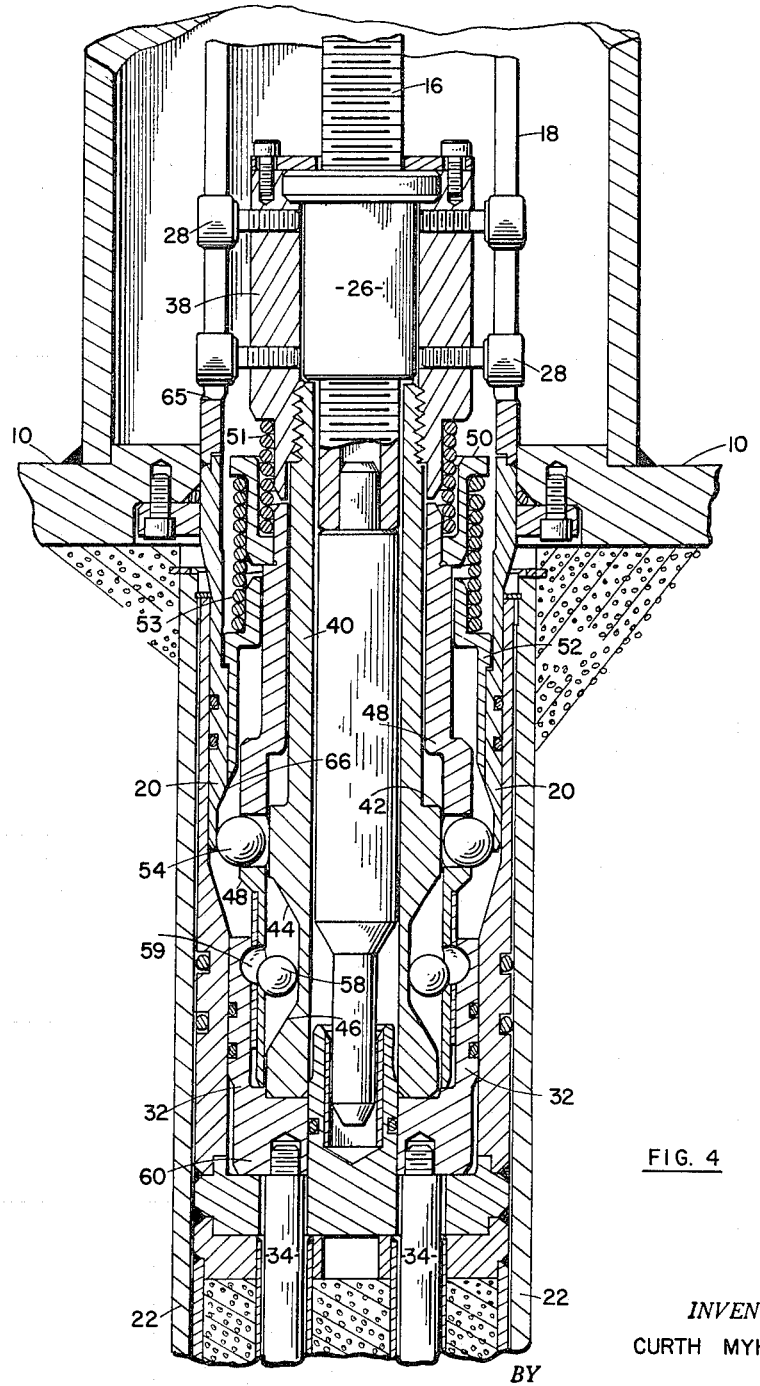
FIGURE 4 is a sectional view of the coupling in its uncoupled position prior to removal of the drive unit.

The position shown in FIGURE 3 is that where the rods 34 and connector 32 are in their lowest position and are being supported by the shield plate 60, which is integrally connected through the upper portion 24 to the reactor face 10. Thus, in this position the weight of the rods 34 and poison rings 36 is no longer supported by the ball nut 26 but, as is apparent from the drawing, rod interlocking ball 58 is still maintaining the positive connection between the plunger 40 and the connector 32. However, the upper locking ball 54 is free to move outwardly from the position 61 to the position 62, since the upper ball lock or retainer 52, although biased downwardly by spring 53, has engaged shoulder 63 on the lower portion of guide tube 20. Thus, the retainer 52 has been moved to an inoperative position by the movement of the control rod to its lowest position. However, since the positive engagement still exists through rod interlocking ball 58, any upward movement of the ball nut 26 will result in the movement of upper locking ball 54 from the position 62 to the position 61 because the retainer 52 will move downwardly with respect to the ball 54 and force it inwardly. Therefore, it is apparent that the mere movement of the rods 34 and connector 32 to their lowest position will not automatically disengage the connector from the ball nut 26 but is merely one condition which is required before the connector can be disengaged from the ball nut 26, since the movement of the upper locking ball 54 from the position 61 to the position 62 is required before the latch cup 32 can be disconnected. It should be noted that the roller cam followers 28 are not, as yet, in the position shown in FIGURE 3, at their lowest position. The disconnection of latch cup 32 from ball nut 26 is shown in FIGURE 4. Here the ball nut has been driven to its lowest position and the cam followers 28 are essentially at the end 65 of the slots in guide tube 18. This movement of ball nut 26 from the position shown in FIGURE 3 to the position shown in FIGURE 4 compresses the spring 51 and drives the plunger 40 downwardly so that the shoulder 42 is moved out of abutting relationship with the shoulder on sleeve 48. The upper locking ball 54, being in the position 62 as shown in FIGURE 3, does not prevent the downward movement of the plunger 40. However, the movement of lower cam surface 46 allows the rod interlock ball 58 to move out the detent 59 and disengages connector 32 from the sleeve 48. In this manner, while the connector 32 is disengaged, the movement of the upper locking ball 54 into position 62 and the positioning of the larger diameter portion of plunger 40 adjacent the ball 54 provides a positive contact between the sleeve 48 and a sloping shoulder portion 66 on the lower portion 20 of guide tube 18 which prevents the upper locking ball from falling out. Thus, while the connector 32, rods 34, and poison rings 36 are now being supported by the shield plate 60 and are disconnected from the drive mechanism ball screw and ball nut, both the upper ball 54 and rod interlock ball 58 are confined to an inoperative position so that the mechanism can be removed by lifting tube 18 from the reactor face without withdrawing the long rods 34 and the attached poison rings 36 and without any danger of either upper ball 54 or interlock ball 58 falling into the thimble or reactor.

It is apparent from the above description that the only force required to engage or disengage the coupling 30 as well as to move the control rod is the drive mechanism 12, there being no special release tools or access required in the operation of the coupling.

While presently preferred embodiments have been described, modifications of the present invention and other uses thereof will be aparent to those skilled in the art. Therefore the invention is not limited by the foregoing description, but only by the claims.

What is claimed is:

1. A coupling for disengageably connecting a member and a connector comprising in combination a plunger, a sleeve around said plunger having a first and second locking element therein, said locking elements being laterally movable, said plunger and said sleeve being relatively axially movable, said plunger having a pair of opposed cam surfaces thereon adapted to engage said first and second locking elements and limiting inward lateral movement of said elements, said plunger being connected to said member, said connector having a detent adapted to receive said first locking element, means for retaining said second locking element in said sleeve and adjacent said plunger, means for removing said retaining means including means for moving said plunger and sleeve relative to each other so that said second locking element is forced outwardly by one of said cam surfaces and said first locking element is movable inwardly out of engagement with said connector.

2. A coupling comprising a plunger, a sleeve around said plunger, said sleeve and plunger being axially slidable relative to each other, a first movable means in said sleeve for releasably connecting said sleeve and said plunger, a connector, second movable means in said sleeve for releasably connecting said plunger and said sleeve with said connector, means for maintaining said first connection between said sleeve and said plunger including a first cam means on said plunger and retainer means for limiting the movement of said first means, second cam means on said plunger opposed to said first cam means and engaging said second movable means for maintaining and said connection between said plunger, said sleeve, and said connector, means for moving said sleeve and plunger relative to each other and simultaneously moving said retainer means into an inoperative position so that said first movable means is disconnected from said plunger and said second movable means is disconnected from said connector.

3. A coupling for disengageably connecting a member and a connector comprising in combination, a connector, a plunger adapted to be attached to said member, a sleeve around said plunger having a first and second locking element therein, said first locking element having a first position connecting said plunger and said sleeve and a second position released from said plunger, means for retaining said first locking element in said first position, said second locking element having a first position interconnecting said plunger with said sleeve and said connector and a second position interconnecting said sleeve and plunger, cam means on said plunger adapted to engage said first and second locking means, means for moving said plunger relative to said sleeve and for disengaging said retaining means so that said first and second locking elements are moved from said first to said second positions.

4. A coupling for disengageably connecting a member and a connector comprising in combination a plunger adapted to be attached to said member, a sleeve around said plunger and having a first and second locking element therein, said plunger and sleeve being slidable relative to each other, said first locking element having a first position connecting said plunger and said sleeve and a second position wherein said plunger is slidable, means for retaining said first locking element in said first position, said second locking element having a first position interconnecting said plunger and said sleeve and said connector and a second position interconnecting said sleeve and plunger, cam means on said plunger adapted to engage said first and second locking means, said cam means including opposed cam surfaces for releasably engaging said first and second locking elements, means for releasing said retaining means, means for sliding said plunger relative to said sleeve so that upon release of said retaining means said first locking means is moved from said first position to said second position, said opposed cam surfaces are disengaged from said locking means and said second locking means is moved to said second position.

5. A coupling comprising a plunger, a sleeve slidable on said plunger, said sleeve having first and second locking elements therein, said locking elements being laterally movable within said sleeve, first means for limiting the outward lateral movement of said first locking element, a pair of opposed cam surfaces on said plunger adapted to engage said first and second locking elements, means for removing said first limiting means from said first locking element, second limiting means for preventing loss of said first locking means from said sleeve upon removal of said first limiting means, and means for moving said plunger relative to said sleeve to move one of said cam surfaces to force said first locking element laterally outwardly to contact said second limiting means and to move the other cam surfaces out of engagement with said second locking element.

6. A coupling comprising a plunger, said plunger having a reduced diameter portion including a pair of opposed cam surfaces, a sleeve slidable on said plunger and containing first and second laterally movable ball locking members, means for sliding said sleeve on said plunger, said first locking members engaging one of said cam surfaces and locking said sleeve and said plunger together, said second locking members engaging the other cam surface, means releasably limiting the lateral movement of said first locking members, said second locking members being forced outwardly by said other cam surface to a position adapted to engage the member to be coupled to said plunger, means for moving said plunger and said sleeve axially, and means to release said limiting means when said plunger and sleeve are moved past a predetermined point.

7. A coupling comprising a plunger, said plunger having a reduced diameter portion including a pair of opposed cam surfaces, a sleeve slidable on said plunger and containing first and second laterally movable ball locking members, means for sliding said sleeve on said plunger, said first locking members engaging one of said cam surfaces and locking said sleeve and said plunger together, said second locking members engaging the other cam surface, means releasably limiting the lateral movement of said first locking members, said second locking members being forced outwardly by said other cam surface to a position adapted to engage the member to be coupled to said plunger, means for driving said plunger and said sleeve as a unit in an axial direction, and means for stopping the movement of said sleeve at a predetermined point while said plunger continues to move axially.

8. A coupling comprising a plunger, said plunger having a reduced diameter portion including a pair of opposed cam surfaces, a sleeve slidable on said plunger and containing first and second laterally movable ball locking members, means for sliding said sleeve on said plunger, said first locking members engaging one of said cam surfaces and locking said sleeve and said plunger together, said second locking members engaging the other cam surface, means releasably limiting the lateral movement of said first locking members, said second locking members being forced outwardly by said other cam surface to a position adapted to engage the member to be coupled to said plunger, means for driving said plunger, sleeve, and limiting means as a unit in an axial direction, means for stopping said limiting means at a first position so that said first locking member is free to move laterally outwardly, means for stopping said sleeve at a second position axially spaced from said first position, said driving means moving said plunger to a third axially spaced position and moving said cam surfaces to force said first ball locking element outwardly and release said second ball locking element.

References Cited in the file of this patent

FOREIGN PATENTS 691,375     France _____ July 8, 1930